United States Patent
Jung et al.

(10) Patent No.: US 9,502,713 B2
(45) Date of Patent: Nov. 22, 2016

(54) ANODE ACTIVE MATERIAL FOR LITHIUM SECONDARY BATTERY AND LITHIUM SECONDARY BATTERY HAVING THE SAME

(75) Inventors: Dong-Sub Jung, Daejeon (KR); Ki-Tae Kim, Daejeon (KR); Je-Young Kim, Daejeon (KR); Hye-Min Ji, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/537,367

(22) Filed: Jun. 29, 2012

(65) Prior Publication Data

US 2012/0264015 A1     Oct. 18, 2012

Related U.S. Application Data

(63) Continuation of application No. PCT/KR2011/004210, filed on Jun. 8, 2011.

(30) Foreign Application Priority Data

Jun. 10, 2010 (KR) .......................... 10-2010-0054752
Jun. 8, 2011 (KR) .......................... 10-2011-0055092

(51) Int. Cl.
| | | |
|---|---|---|
| *H01M 4/1395* | (2010.01) | |
| *H01M 4/38* | (2006.01) | |
| *H01M 4/134* | (2010.01) | |
| *H01M 10/052* | (2010.01) | |
| *C22C 28/00* | (2006.01) | |

(52) U.S. Cl.
CPC .............. *H01M 4/134* (2013.01); *C22C 28/00* (2013.01); *H01M 4/38* (2013.01); *H01M 10/052* (2013.01); *Y02E 60/122* (2013.01)

(58) Field of Classification Search
CPC ................ H01M 4/134; H01M 4/1395; H01M 4/386
USPC .................................. 429/209–246; 420/578
See application file for complete search history.

(56) References Cited

U.S. PATENT DOCUMENTS

| | | | |
|---|---|---|---|
| 2003/0157407 A1 | 8/2003 | Kosuzu et al. | |
| 2006/0127773 A1 | 6/2006 | Kawakami et al. | |
| 2007/0082266 A1* | 4/2007 | Waki et al. | 429/224 |
| 2008/0081260 A1* | 4/2008 | Yamamoto et al. | 429/221 |
| 2008/0241665 A1 | 10/2008 | Sano | |
| 2009/0176158 A1* | 7/2009 | Ugaji et al. | 429/220 |

FOREIGN PATENT DOCUMENTS

| | | |
|---|---|---|
| CN | 101281985 A | 10/2008 |
| CN | 101355146 A | 1/2009 |
| CN | 101675546 A | 3/2010 |
| EP | 0750359 A2 | 12/1996 |
| JP | 10294112 A * | 11/1998 |
| KR | 20090105868 A | 10/2009 |

OTHER PUBLICATIONS

Translation of JP 10-294112 A (Nakajima).*
Ozols, K., "Properties of resistive films from alloys based on mixtures titanium disilicide and silicides of metals", Latvian Journal of Physics and Technical Sciences (1993), (5), 45-50.*
International Search Report PCT/KR2011/004210 dated Feb. 6, 2012.
F. R. de Boer et al., "Cohesion in metals : transition metal alloys", New York (1988), pp. 133, 156, 206, 233, 277, 314, 375, and 508.

* cited by examiner

*Primary Examiner* — Barbara Gilliam
*Assistant Examiner* — Helen M McDermott
(74) *Attorney, Agent, or Firm* — Lerner, David, Littenberg, Krumholz & Mentlik, LLP

(57) ABSTRACT

An anode active material for a lithium secondary battery and a lithium secondary battery having the same are disclosed. The anode active material for a lithium secondary battery includes a silicon alloy consisting of silicon and at least two kinds of metals other than silicon, each having the heat of mixing with the silicon of −23 kJ/mol or less. The anode active material for a lithium secondary battery has a high capacity, and thus, is useful in fabricating a high-capacity lithium secondary battery. Also, the anode active material for a lithium secondary battery has a small crystal size of a silicon phase and consequently a small change in volume during charging/discharging, and thus, ensures excellent cycle life characteristics in applications to batteries.

3 Claims, No Drawings

ANODE ACTIVE MATERIAL FOR LITHIUM SECONDARY BATTERY AND LITHIUM SECONDARY BATTERY HAVING THE SAME

CROSS-REFERENCE TO RELATED APPLICATION(S)

This application is a continuation of International Application No. PCT/KR2011/004210 filed on Jun. 8, 2011, which claims priority under 35 USC 119(a) to Korean Patent Application No. 10-2010-0054752 filed in the Republic of Korea on Jun. 10, 2010 and Korean Patent Application No. 10-2011-0055092 filed on Jun. 8, 2011, the entire contents of which are incorporated herein by reference.

BACKGROUND

Field

The present invention relates to an anode active material for a lithium secondary battery and a lithium secondary battery having the same. More particularly, the present invention relates to an anode active material for a lithium secondary battery including a silicon-based alloy with a small crystal size, and a lithium secondary battery having the same.

Description of Related Art

Different types of electrolytes are used for electrochemical devices widely used these days, for example, lithium secondary batteries, electrolytic condensers, electric double-layer capacitors and electrochromic display devices, as well as dye-sensitized solar cells of which various studies are being undertaken for future commercialization, and so the importance of electrolytes is increasing day by day.

In particular, lithium secondary batteries are attracting the most attention for its high energy density and long cycle life. Generally, a lithium secondary battery includes an anode made from carbon material or lithium metal alloy, a cathode made from lithium metal oxide, and an electrolyte made by dissolving a lithium salt in an organic solvent.

Initially, lithium metal was used as an anode active material for an anode of a lithium secondary battery. However, because lithium has low reversibility and low safety, currently carbon material is mainly used as an anode active material of a lithium secondary battery. The carbon material has low capacity compared with lithium, but is advantageous in that it has a small change in volume, excellent reversibility, and low price.

As the use of lithium secondary batteries are increasing, so does the demand for high-capacity lithium secondary batteries. Accordingly, there is a demand for high-capacity anode active materials that may substitute the carbon material having low capacity. In order to meet the demand, attempts were made to use metals as an anode active material, for example, Si, Sn, and the like, that have a higher charge/discharge capacity than the carbon material and that allow electrochemical alloying with lithium.

However, this metal-based anode active material has a great change in volume during charging/discharging, which may cause cracks to the active material. Secondary batteries using this metal-based anode active material may suddenly deteriorate in capacity and reduce in cycle life over repeated cycles of charging/discharging, and thus, are not suitable for commercial use.

To solve this problem, attempts have been made to use an alloy of Si and other metal or an alloy of Sn and other metal as an anode active material. However, the use of such an alloy contributes to the improvement of cycle life characteristics and prevention of volume expansion to some extent when compared with the use of metal alone as an anode active material, but the extent is insufficient for commercial use.

More specifically, an anode active material made from an alloy of Sn and other metal or an alloy of Sn and other metal has an Si or Sn phase capable of bonding with lithium and an irreversible phase incapable of bonding with lithium. In this instance, ideally, the Si or Sn phase capable of bonding with lithium and the irreversible phase incapable of bonding with lithium form particles of a nano-scale size and uniformly disperse the particles. To realize the ideal, an amorphous phase is preferably formed when manufacturing a silicon alloy, or even though a crystal phase is present, the size of the crystal phase needs to be at several nano scale. However, since the formation of a crystal phase is thermodynamically stable during cooling subsequent to melting in the manufacturing of an alloy, a crystal phase having a size of several microns is generally formed.

A crystal phase having a size of several microns still causes a change in volume during charging/discharging.

SUMMARY

Therefore, it is an object of the present invention to provide a metal-based anode active material for a lithium secondary battery, which has a high capacity and a small volume expansion, and consequently, excellent cycle life characteristics; and a lithium secondary battery having the same.

In order to achieve the object, the present invention provides an anode active material for a lithium secondary battery that includes a silicon alloy consisting of silicon and at least two kinds of metals, each having the heat of mixing with the silicon of −23 kJ/mol or less.

The silicon alloy of the present invention may be, for example, represented by the following chemical formula 1, however the present invention is not limited in this regard.

$$Si_xA_yB_z$$  [Chemical formula 1]

where each of A and B is independently Ti, La, Ce, V, Mn, Zr, or Ni, A and B are different from each other, and each of x, y, and z indicates atomic %, x+y+z=100, 60≤x, 0<y<25, 0<z<25, preferably, 70≤x, 0<y≤15, 0<z≤20.

In the silicon alloy of the present invention, a silicon phase preferably has a crystal size of 5 nm to 20 nm.

The anode active material of the present invention may be usefully employed in manufacturing an anode of a lithium secondary battery including a current collector and an anode active material layer formed on at least one surface of the current collector.

DETAILED DESCRIPTION

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

An anode active material for a lithium secondary battery according to the present invention includes a silicon alloy consisting of silicon and at least two kinds of metals, each having the heat of mixing with the silicon of −23 kJ/mol or less.

When a silicon alloy is used as an anode active material, one anode active material particle has a silicon phase capable of reacting with lithium and an irreversible phase (where silicon and an metal element other than silicon are present together or a metal other than silicon is present alone) incapable of reacting with lithium. However, as described above, reducing the size of the silicon phase and the irreversible phase is a very important key in suppressing the volume change of the anode active material.

The inventors found that an alloy consisting of silicon and at least two kinds of metals having the heat of mixing with the silicon of −23 kJ/mol or less has a remarkable reduction in a crystal size in the alloy, particularly a crystal size of a silicon phase.

The heat of mixing represents heat generated or absorbed when mixing two different materials. In the present invention, mixing of silicon and other metal represents mixing in a molten state. Also, in the present invention, the heat of mixing having a minus value represents that the mixing reaction between silicon and other metal is an exothermic reaction.

In the present invention, each of at least two kinds of the metals other than silicon used in the silicon alloy is not limited to a specific kind of metal if the heat of mixing with silicon is −23 kJ/mol or less. For example, Ti, La, Ce, V, Mn, Zr, or Ni may be mentioned, however the present invention is not limited in this regard. The heat of mixing of these exemplary metals with silicon is listed in Table 1 below (q. v. Boer, F. R. de (Frank R.), "Cohesion in metals: transition metal alloys", New York (1988)).

TABLE 1

| | Ti | La | Ce | V | Mn | Zr | Ni |
|---|---|---|---|---|---|---|---|
| Heat of mixing (kJ/mol) | −49 | −56 | −56 | −31 | −28 | −67 | −23 |

An example of the silicon alloy according to the present invention is represented by the following chemical formula 1:

$Si_xA_yB_z$         [Chemical formula 1]

where each of A and B is independently Ti, La, Ce, V, Mn, Zr, or Ni, A and B are different from each other, and each of x, y, and z indicates atomic %, x+y+z=100, 60≤x, 0<y<25, 0<z<25, preferably, 70≤x, 0<y≤15, 0<z≤20.

In the silicon alloy of the present invention, when x is less than 60 at. % or y and z are 25 at. % or more, the anode active material including the silicon alloy may have a reduction in capacity.

In the anode active material of the present invention, the silicon phase has a small crystal size of several nanometers. For example, the crystal size is preferably 5 nm to 20 nm, however the present invention is not limited in this regard. When the crystal size of the silicon phase is within the above range, the volume change of the anode active material may be effectively suppressed during charging/discharging.

The silicon alloy of the present invention may be manufactured by a general alloy manufacturing method. An example of the method is as follows:

First, silicon, or silicon and an alloy element are melted under an inert atmosphere. Next, the melt is cooled and pulverized into a powder. The obtained powder is milled to yield an anode active material having a predetermined average particle size.

In this instance, the melting of the raw materials is preferably performed under an inert atmosphere to prevent the introduction of impurities.

The cooling of the metal melt may be performed by any conventional method in the art, preferably a rapid solidification method.

The rapid solidification of the metal melt generates a large amount of precipitation nuclei, resulting in silicon or a silicon alloy in a powder state. For rapid solidification, a conventional process in the art may be used, for example, a gas atomization process, a roll quenching process, a rotating electrode process, and the like.

The powder obtained by the rapid solidification method is further milled using a ball mill, to produce a silicon alloy-based anode active material powder having a required predetermined average particle size. Preferably, an available average particle size for the anode active material is 0.5 μM (micrometer) to 50 μM.

The anode active material prepared above may be used in manufacturing an anode by a conventional method in the art. Also, a cathode of the present invention may be manufactured by a conventional method in the art. For example, the electrode active material of the present invention is mixed with a binder, a solvent, and optionally a conducting material and a dispersing agent to prepare a slurry, which is applied to a current collector, followed by compression molding.

The binder may include various kinds of binder polymers, for example, vinylidenefluoride-hexafluoropropylene copolymer (PVDF-co-HFP), polyvinylidenefluoride, polyacrylonitrile, polymethylmethacrylate, styrene-butadiene rubber (SBR), and the like.

The cathode active material usable in the present invention preferably includes a lithium-containing transition metal oxide, for example, any one selected from the group consisting of $Li_xCoO_2$(0.5<x<1.3), $Li_xNiO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$ (0.5<x<1.3, 0≤y<1), $Li_xNi_{1-y}Mn_yO_2$(0.5<x<1.3, 0≤y<1), $Li_x(Ni_aCo_bMn_c)O_4$(0.5<x<1.3, 0<a<2, 0<b<2, 0<c<2, a+b+c=2), $Li_xMn_{2-z}N_zO_4$(0.5<x<1.3, 0<z<2), $Li_xMn_{2-z}Co_zO_4$ (0.5<x<1.3, 0<z<2), $Li_xCoPO_4$(0.5<x<1.3), and $Li_xFePO_4$ (0.5<x<1.3), or mixtures thereof. The lithium-containing transition metal oxide may be coated with metal such as Al or metal oxide. Also, lithium-containing transition metal sulfide, selenide, or halide may be used as well as the lithium-containing transition metal oxide.

After the electrode is made, a typical lithium secondary battery including the cathode, the anode, a separator interposed between the cathode and the anode, and an electrolyte may be fabricated.

In the present invention, a lithium salt used as a solute of the electrolyte is not specially limited if it is conventionally used in an electrolyte for a lithium secondary battery. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte used in the present invention, an organic solvent contained in the electrolyte is not specially limited if it is conventionally used in an electrolyte for a lithium secondary battery. For example, the organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, vinylene carbonate, sulforane, γ-buryrolactone, propylene sulfite, and tetrahydrofuran, or mixtures thereof. In particular, among the above carbonate-based organic solvents, ethylene carbonate and propylene carbonate that are cyclic carbonates are preferred, since they have high viscosity and consequently a high dielectric constant, and thus, easily dissociate the lithium salt in the electrolyte. More preferably, when linear carbonate having low viscosity and a low dielectric constant, such as dimethyl carbonate and diethyl carbonate, is mixed with the cyclic carbonate at a suitable ratio, the use of the mixture contributes to a high electric conductivity of an electrolyte.

Optionally, the electrolyte stored according to the present invention may further include an additive such as an overcharge inhibitor which is conventionally used in an electrolyte.

Also, the separator may include, but is not limited to, a single-layered or multi-layered porous polymer film conventionally used as a separator, and a porous non-woven fabric conventionally used as a separator, and the like. The porous polymer film may be made from polyolefin-based polymer, for example, ethylene homopolymer, propylene homopolymer, ethylene/butene copolymer, ethylene/hexene copolymer, and ethylene/methacrylate copolymer, and the porous non-woven fabric may be made from, for example, high-melting glass fibers, polyethylene terephthalate fibers, and the like. However, the present invention is not limited in this regard.

A battery casing used in the present invention may be any one conventionally used in the art, and the appearance of the battery casing is not limited to a specific shape based on the purpose of use of the battery. For example, the battery casing may have a cylindrical shape, a prismatic shape, a pouch shape, or a coin shape.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLES 1 TO 7 AND COMPARATIVE EXAMPLES 1 TO 3

<Preparation of Anode Active Material>

Metals were mixed by at. % as shown in Table 2 below, and melted under an argon circumstance by high-frequency heating, thereby obtaining an alloy melt. The alloy melt was quenched by gas atomization using argon gas under a pressure of 80 kg/cm$^2$, thereby preparing an alloy powder having an average particle size of about 100 μm. In this instance, the quenching rate was 1×10$^5$ K/sec. The alloy powder was milled using a ball mill for 10 minutes to yield an anode active material powder having an average particle size of about 0.5 μm to about 50 μm.

Also, the silicon alloy-based anode active material was measured using X-ray diffraction (Bruker AXS D4 Endeavor XRD) (voltage: 35 kV, current: 28 mA, 2θ: a region from 10° to 120° measured at an interval of 0.019° every 696 seconds) to determine a crystal size of an Si phase.

TABLE 2

| | Metal (Si/A/B) | Content (at. %) | Heat of mixing of A with Si (kJ/mol) | Heat of mixing of B with Si (kJ/mol) | Crystal size of Si (nm) |
|---|---|---|---|---|---|
| Example 1 | Si/Ce/Ni | 73/9/18 | −56 | −23 | 14 |
| Example 2 | Si/Ce/Ti | 81/9/10 | −56 | −49 | 13 |
| Example 3 | Si/Ni/Ti | 72/10/18 | −23 | −49 | 12 |
| Example 4 | Si/Ni/Ti | 76/4/20 | −23 | −49 | 12 |
| Example 5 | Si/La/Ni | 73/9/18 | −56 | −23 | 13 |
| Example 6 | Si/La/Ti | 81/9/10 | −56 | −49 | 12 |
| Example 7 | Si/Ni/Mn | 74/12/14 | −23 | −28 | 13 |
| Comparative example 1 | Si/Ce/Cu | 73/9/18 | −56 | −2 | 150 |
| Comparative example 2 | Si/Co/Cu | 73/9/18 | −21 | −2 | 145 |
| Comparative example 3 | Si/Ce/Fe | 82/8/10 | −56 | −18 | 130 |

As shown in Table 2, according to comparative examples 1 and 3, only one (Ce) of two kinds of metals forming an alloy with silicon has the heat of mixing with silicon of −23 kJ/mol or less, and according to comparative example 2, two kinds of metals have both the heat of mixing with silicon of more than −23 kJ/mol.

It is found that example alloys using two kinds of metals having the heat of mixing with silicon of −23 kJ/mol or less have a remarkably smaller crystal size of a silicon phase in the alloys than that of comparative examples.

<Fabrication of Secondary Battery>

The obtained anode active material powder was mixed with ketjen black as a conductive material and polyvinylidene fluoride (PVdF) as a binder at a weight ratio of 90:2:8, and then mixed with N-methyl-2-pyrrolidone (NMP) as a solvent, to prepare an anode slurry. The prepared electrode slurry was applied to one surface of a copper current collector, and dried at about 130° C. for 2 hours, thereby obtaining an anode having a size of 1.4875 cm$^2$.

Ethylene carbonate (EC) and diethyl carbonate (DEC) were mixed at a volume ratio of 1:2, and LiPF$_6$ was then added to the nonaqueous electrolyte solvent, thereby obtaining 1M LiPF$_6$ nonaqueous electrolyte.

A coin-type bi-cell was fabricated by interposing a polyolefin separator between the obtained anode and a cathode of a lithium metal foil, and pouring the prepared electrolyte.

EXPERIMENTAL EXAMPLE

The batteries fabricated according to examples and comparative examples were evaluated for charge/discharge characteristics.

Specifically, battery charging was made with a current density of 0.1 C up to 5 mV at CC mode, kept at 5 mV at CV mode, and completed when the current density reached 0.005 C, and battery discharging was made with a current density of 0.1 C up to 1V at CC mode. The charging/discharging was repeated 50 times under the same conditions.

The results of the measured charge/discharge characteristics are shown in Table 3 below.

In Table 3, the initial efficiency represents a ratio of a first discharge capacity to a first charge capacity, the capacity retention ratio represents a ratio of 50$^{th}$ discharge capacity to a first discharge capacity, and the thickness expansion ratio represents a ratio of an electrode thickness after 50th cycle charge to an electrode thickness before the charge/discharge.

TABLE 3

|  | 1st discharge capacity (mAh/g) | Initial efficiency (%) | Capacity retention ratio (%) | Thickness expansion ratio (%) |
| --- | --- | --- | --- | --- |
| Example 1 | 950 | 86.5 | 92 | 90 |
| Example 2 | 910 | 86.2 | 93 | 85 |
| Example 3 | 975 | 87.0 | 94 | 95 |
| Example 4 | 955 | 87.2 | 94 | 95 |
| Example 5 | 940 | 86.3 | 91 | 88 |
| Example 6 | 900 | 86.0 | 92 | 84 |
| Example 7 | 970 | 86.2 | 93 | 95 |
| Comparative example 1 | 940 | 85.3 | 40 | 220 |
| Comparative example 2 | 970 | 85.4 | 35 | 240 |
| Comparative example 3 | 950 | 84.5 | 34 | 250 |

As shown in Table 3, it is found that examples 1 to 7 having a remarkably smaller crystal size of a silicon phase than that of comparative examples exhibit a remarkably higher capacity retention ratio at least two times and a remarkably lower thickness expansion ratio.

According to teachings above, the anode active material for a lithium secondary battery according to the present invention has a high capacity, and thus, is advantageous in the manufacturing of a high-capacity lithium secondary battery.

Also, the anode active material for a lithium secondary battery according to the present invention has a small crystal size of a silicon phase in a silicon alloy and consequently a small change in volume during charging/discharging, and thus, ensures excellent cycle life characteristics in applications to batteries.

What is claimed is:

1. An anode active material for a lithium secondary battery, consisting of:
    a silicon alloy in powder form including:
        silicon; and
        two kinds of metals other than the silicon, each having the heat of mixing with the silicon of −23 kJ/mol or less,
    wherein:
        (a) the heat of mixing represents heat generated or absorbed when mixing the silicon and the two kinds of metals other than the silicon in a molten state, and the heat of mixing having a minus value represents that the mixing reaction between the silicon and the at least two kinds of metals other than the silicon in a molten state is an exothermic reaction;
        (b) the silicon alloy is represented by the following Chemical Formula 1:

$Si_xA_yB_z$ <span>Chemical Formula 1</span> wherein A is Ce or La, B is Ni or Ti;
and each of x, y, and z indicates atomic %, $x+y+z=100$, $70 \leq x$, $0 < y \leq 15$, $0 < z \leq 20$;
        (c) the silicon phase of the silicon alloy has a crystal size of 5 nm to 20 nm; and
        (d) the silicon alloy has an average particle size of 0.5 μm (micrometer) to 50 μm.

2. An anode of a lithium secondary battery, comprising:
a current collector; and
an anode active material layer formed on at least one surface of the current collector, comprising the anode active material defined in claim 1 and a binder.

3. A lithium secondary battery, comprising:
a cathode;
the anode as defined in claim 2; and
a separator interposed between the cathode and the anode.

* * * * *